Patented Jan. 8, 1935

1,986,880

UNITED STATES PATENT OFFICE 1,986,880

TREATMENT OF CELLULOSE AND PRODUCTS OBTAINED THEREFROM

Henry Dreyfus, London, England

No Drawing. Application July 23, 1930, Serial No. 470,234. In Great Britain August 16, 1929

16 Claims. (Cl. 260—101).

This invention is a continuation in part of the inventions of my prior U. S. applications S. Nos. 301,927 filed 24th August, 1928, 321,750 filed 24th November, 1928, 321,751 filed 24th November, 1928, 470,229 filed 23rd July, 1930, 470,230 filed 23rd July, 1930 and 470,231 filed 23rd July, 1930. It relates to new processes for the production of cellulose acetate or other cellulose esters, for example cellulose propionate or cellulose butyrate.

All my said prior specifications describe the esterification of cellulose by means of aliphatic acid anhydrides in presence of metal chlorides or other halides with or without hydrochloric acid or other hydrohalide acid.

I have now found that in such processes superior results are obtained if the cellulosic materials to be esterified contain more than 8% of water, and still better results are obtained if the cellulosic materials contain 10, 15, 20 or 30% or more of water.

According to the present invention, therefore, cellulose acetate or other cellulose esters are obtained by esterification with aliphatic anhydrides of cellulosic materials containing more than 8%, and preferably more than 10 or 15%, of water in presence of metal halides alone or in admixture with hydrohalide acids.

The actual esterification may be effected by any of the processes of my said prior specifications, namely by treatment with acetic acid or other aliphatic acid anhydride in presence of halides and particularly chlorides of iron, tin, cobalt, nickel, manganese or copper together with hydrochloric acid, hydrobromic acid or hydriodic acid; or in presence of ferric chloride or bromide as sole catalyst. Preferably such catalysts are employed in a proportion of more than 2% of the metal halide relative to the cellulose, and in the case of using a hydrohalide acid this also is preferably present in a proportion of more than 2%. The best results are obtained by effecting the treatment with the aliphatic acid anhydride in presence of 5 to 10% of metal halide with 5–10% of hydrohalide acid, though very good results are also obtainable with 5 to 15% of ferric chloride or bromide used alone or the corresponding stannic halides.

Furthermore as is described in my U. S. applications S. Nos. 470,229 and 470,231, the esterification may be carried out in presence of a ferric chloride or bromide catalyst containing a greater quantity of iron than that which corresponds with the chloride or bromide present. Such excess of iron may, for example, be present in the form of ferric oxide or ferric hydroxide, and may be introduced either as such into the acetylating mixture or may be formed therein by partial neutralization of ferric chloride or ferric bromide. Again the proportion of chloride or bromide radicle to iron may vary during the actual esterification. For example the esterification may be begun in presence of ferric chloride and hydrochloric acid, and during the esterification the acid wholly or in part neutralized, and if desired the halide radicle itself may also be partly neutralized, the neutralization being effected in one or more stages. Similarly the esterification may be begun in presence of ferric chloride, and a partial neutralization effected at a later stage or on the contrary hydrochloric acid added.

As with the processes of my earlier applications, the best results are obtained by pretreating the cellulosic materials before esterification with organic acids, and particularly lower fatty acids, such as acetic acid or formic acid and/or with the metal halides or hydrohalide acid to be used in the subsequent esterification. Pretreatments with formic acid, acetic or other lower aliphatic acids may be applied in the liquid state, or may be alone or mixed with inert gases. The pretreatment with organic acids may be carried out with acids of any desired concentration, for example 50, 80, 85 or 100 per cent acetic or formic acid, and in large or small quantities.

The important advance represented by the present invention consists in obtaining superior cellulose esters by carrying out the esterification in presence of metal halides with or without hydrohalide acids starting with a cellulose or a cellulose containing material which contains more than 8% of water and preferably more than 10 or 15%. The water may be introduced into the cellulose by any suitable method. Preferably the cellulosic material is impregnated with the water some time prior to effecting the actual esterification, or prior to effecting the pretreatments referred to above. Cotton, or other celluloses or other cellulosic materials, may, for example, be soaked or steeped in an excess of water, and the water then hydroextracted or pressed out, until the cellulosic material retains the required amount. It may then, if desired, be allowed to stand before applying the esterification or the pretreatment processes.

Alternatively the cellulosic material may be allowed to soak or steep in an excess of water for some time prior to the hydroextraction or pressing out. Chemical wood pulps are preferably subjected to an alkaline purifying treatment prior to esterification and such alkaline purifying treatment is preferably followed by a pretreatment with organic acids as described in U. S. Patent No. 1,711,110, or by a pretreatment with hydrohalide acids and/or halide salts. The alkaline purifying treatment may, for instance, be effected with caustic alkali of relatively low concentration, such as 3 per cent or under, with heating or boiling, or with caustic alkali of relatively high concentration, such as 15 to 20 per cent in the cold or with only slight heating. This alkaline purifying treatment may be employed as the means of introducing "excess water" into cellulosic materials of this type. For example after applying the aqueous alkaline reagent, the alkali may be neutralized and the aqueous liquor hydroextracted, pressed out or otherwise reduced to the required amount, or alternatively, after applying the alkaline purifying treatment, the materials may be washed with water and any excess of water above that required by the present invention removed by any suitable process.

The cellulose esters produced according to the present invention may, if desired, be subjected to any suitable processes of ripening or other treatments for working them up into commercial products.

The following examples illustrate the invention, but are not to be considered as limiting it in any way:—

Example 1

100 parts of cotton linters are steeped in water and the whole allowed to stand over night. The cotton linters are then centrifuged or pressed until they contain 10–15 or 20% of water. They are then treated for three hours in a bath of 600 parts of glacial acetic acid. There are then added 600 parts of acetic anhydride, 100 parts of glacial acetic acid and 20 parts of ferric chloride, and the mass is constantly mixed or stirred during the reaction which is conducted at atmospheric temperature. The acetylation proceeds smoothly and a clear solution is obtained. The solution may either be utilized directly or the cellulose acetate precipitated and redissolved and worked up in any desired manner.

Example 2

100 parts of sulphite pulp are boiled for 1 to 2 hours at atmospheric pressure with a solution of caustic soda of 2 to 3% strength in a proportion of about 20 to 30 times the weight of liquid relatively to the weight of pulp treated and preferably while stirring or agitating. If desired, the boiling may be repeated with a second similar quantity of caustic alkali solution, though this is not essential. The resulting pulp is washed, treated with acetic acid and again washed and centrifuged or pressed so as to contain 15 to 25% of moisture. It is then steeped for 3 to 6 hours in 600 parts of glacial acetic acid. There are then added 600 parts of acetic anhydride, 100 parts of glacial acetic acid and 10 parts of ferric chloride and 10 parts of hydrochloric acid (calculated as HCl) either in the form of the fuming aqueous solution (35% strength) or in solution in the acetic acid. The mass is constantly mixed or stirred during the reaction, which is conducted at ordinary atmospheric temperature. The acetylation proceeds smoothly, a clear solution being obtained. The solution may either be utilized directly or the cellulose acetate may be precipitated and redissolved and worked up in any desired manner.

What I claim and desire to secure by Letters Patent is:—

1. Process for the production of cellulose acetate, comprising esterifying cellulose containing excess water over the hygroscopic content by means of acetic anhydride in presence of ferric chloride.

2. Process for the production of cellulose acetate, comprising esterifying cellulose containing excess water over the hygroscopic content by means of acetic anhydride in presence of ferric chloride and hydrochloric acid.

3. Process for the production of cellulose acetate, comprising treating with a lower aliphatic acid cellulose containing excess water over the hygroscopic content and thereafter esterifying with acetic anhydride in presence of ferric chloride.

4. Process for the production of cellulose acetate, comprising treating with a lower aliphatic acid cellulose containing excess water over the hygroscopic content and thereafter esterifying with acetic anhydride in presence of ferric chloride and hydrochloric acid.

5. Process for the production of organic esters of cellulose, comprising esterifying cellulose containing excess water over the hygroscopic content by means of a lower fatty acid anhydride in the presence of a ferric halide.

6. Process for the production of organic esters of cellulose, comprising esterifying cellulose containing excess water over the hygroscopic content by means of a lower fatty acid anhydride in the presence of ferric chloride.

7. Process for the production of organic esters of cellulose, comprising esterifying cellulose containing excess water over the hygroscopic content by means of a lower fatty acid anhydride in the presence of ferric chloride and hydrochloric acid.

8. Process for the production of cellulose acetate, comprising acetylating cellulose containing excess water over the hygroscopic content by means of acetic anhydride in the presence of a ferric halide catalyst containing iron in the ferric form in greater quantity than is equivalent to the halogen present in the catalyst.

9. Process for the production of organic esters of cellulose, comprising esterifying cellulose containing excess water over the hygroscopic content by means of a lower fatty acid anhydride in the presence of a halide of a metal selected from the group consisting of iron, tin, cobalt, nickel, manganese and copper.

10. Process for the production of cellulose acetate, comprising acetylating cellulose containing excess water over the hygroscopic content by means of acetic anhydride in the presence of a halide of a metal selected from the group consisting of iron, tin, cobalt, nickel, manganese and copper.

11. Process for the production of cellulose acetate, comprising acetylating cellulose containing excess water over the hygroscopic content by means of acetic anhydride in the presence of an hydrohalide acid and a halide of a metal selected from the group consisting of iron, tin, cobalt, nickel, manganese and copper.

12. Process for the production of cellulose acetate, comprising acetylating cellulose containing excess water over the hygroscopic content by means of acetic anhydride in the presence of a chloride of a metal selected from the group consisting of iron, tin, cobalt, nickel, manganese and copper.

13. Process for the production of cellulose acetate, comprising acetylating cellulose containing excess water over the hygroscopic content by means of acetic anhydride in the presence of hydrochloric acid and a chloride of a metal selected from the group consisting of iron, tin, cobalt, nickel, manganese and copper.

14. Process for the production of cellulose acetate, comprising acetylating cellulose containing more than 10% of water by means of acetic anhydride in the presence of a chloride of a metal selected from the group consisting of iron, tin, cobalt, nickel, manganese and copper.

15. Process for the production of cellulose acetate, comprising treating with a lower aliphatic acid cellulose containing excess water over its hygroscopic content, and thereafter acetylating the same with acetic anhydride in the presence of a chloride of a metal selected from the group consisting of iron, tin, cobalt, nickel, manganese and copper.

16. Process for the production of cellulose acetate, comprising treating with a lower aliphatic acid cellulose containing excess water over its hygroscopic content, and thereafter acetylating the same with acetic anhydride in the presence of hydrochloric acid and a chloride of a metal selected from the group consisting of iron, tin, cobalt, nickel, manganese and copper.

HENRY DREYFUS.